United States Patent [19]

Markle

[11] Patent Number: 5,309,801
[45] Date of Patent: May 10, 1994

[54] MICRO-ADJUSTABLE CASE NECK TURNING TOOL

[76] Inventor: Kenneth E. Markle, 2525 Primrose La., York, Pa. 17404

[21] Appl. No.: 871,807

[22] Filed: Apr. 21, 1992

[51] Int. Cl.⁵ .............................................. B23B 5/00
[52] U.S. Cl. ......................................... 82/128; 82/162
[58] Field of Search .......................... 82/137, 162, 128

[56] References Cited

U.S. PATENT DOCUMENTS

| | | | |
|---|---|---|---|
| 2,064,661 | 12/1936 | Hammond | 82/128 |
| 3,137,914 | 6/1964 | Manshel | 82/128 |
| 3,750,618 | 8/1973 | Griebenow | 82/137 |
| 4,178,189 | 12/1979 | Mancini et al. | 134/6 |

OTHER PUBLICATIONS

Advertisement, Marquart Precision Case Neck Turning Tool (undated).

Primary Examiner—Mark Rosenbaum
Assistant Examiner—John M. Husar
Attorney, Agent, or Firm—Samuel M. Learned, Jr.

[57] ABSTRACT

A micro-adjustable case neck turning tool which provides the mechanical capability for case neck trimming blade vernier driven vertical displacement adjustment and set in measured increments of 0.0002-inch and interpolated increments of 0.0001-inch for achieving consistent close tolerance trimming and trueing of the outside diameter of a cartridge case neck, thereby to uniformily undersize the same for close tolerance receiving and positioning thereof upon cartridge lock-up within a firearm chamber and thus increase the inherent cartridge factor accuracy by reducing substantially the potential for a mis-aligned angle of incidence in the bullet-to-bore relationship upon discharge delivery of a bullet from the case mouth into the firearm barrel.

30 Claims, 4 Drawing Sheets

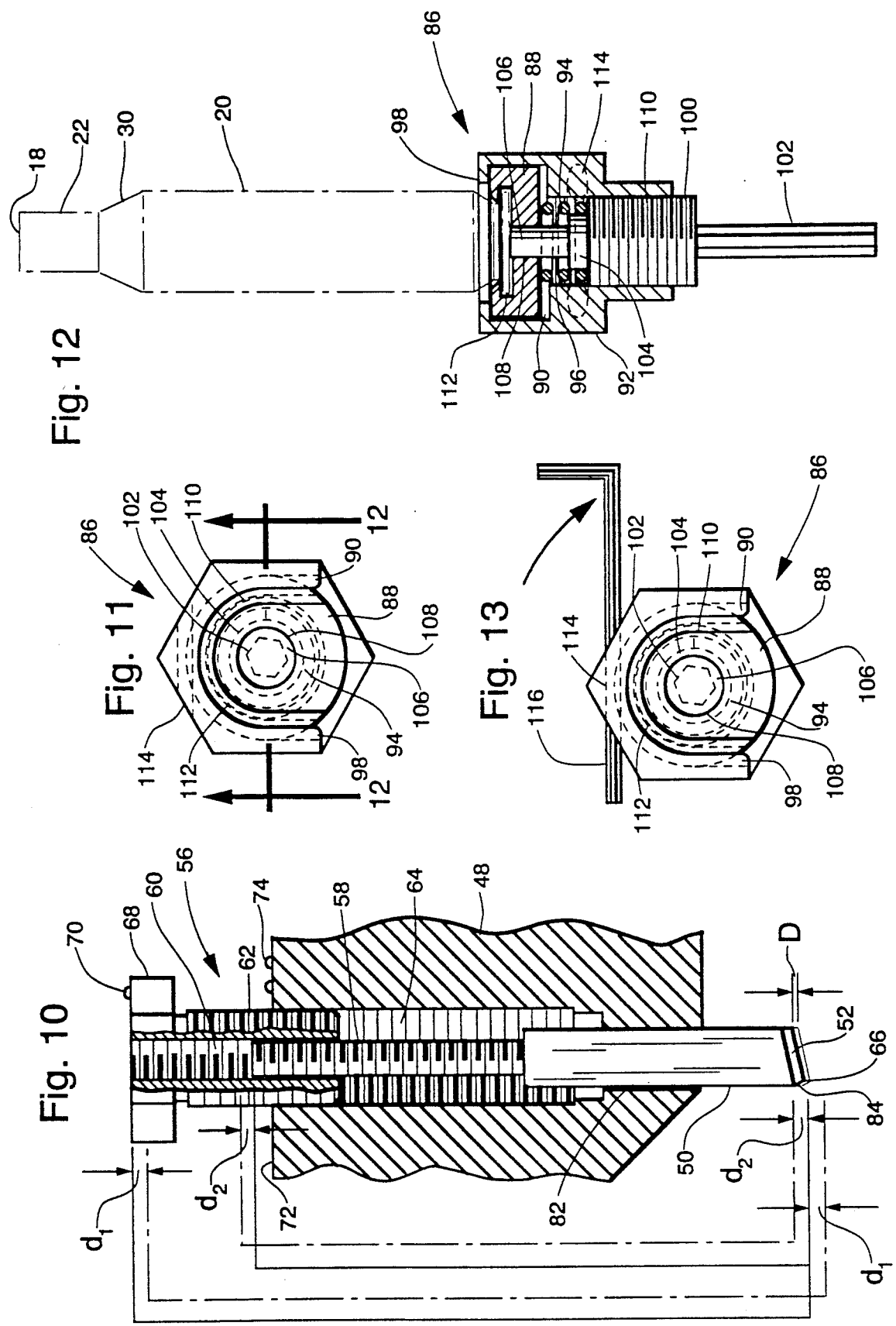

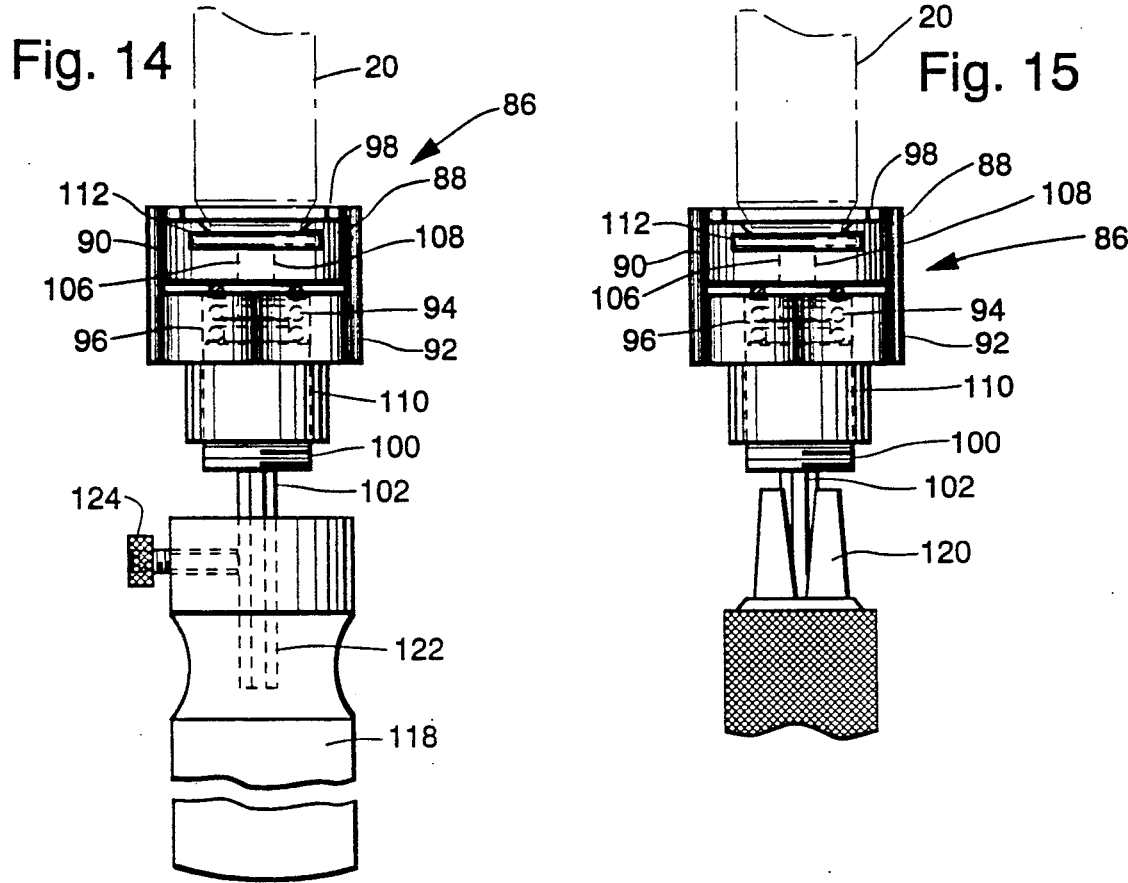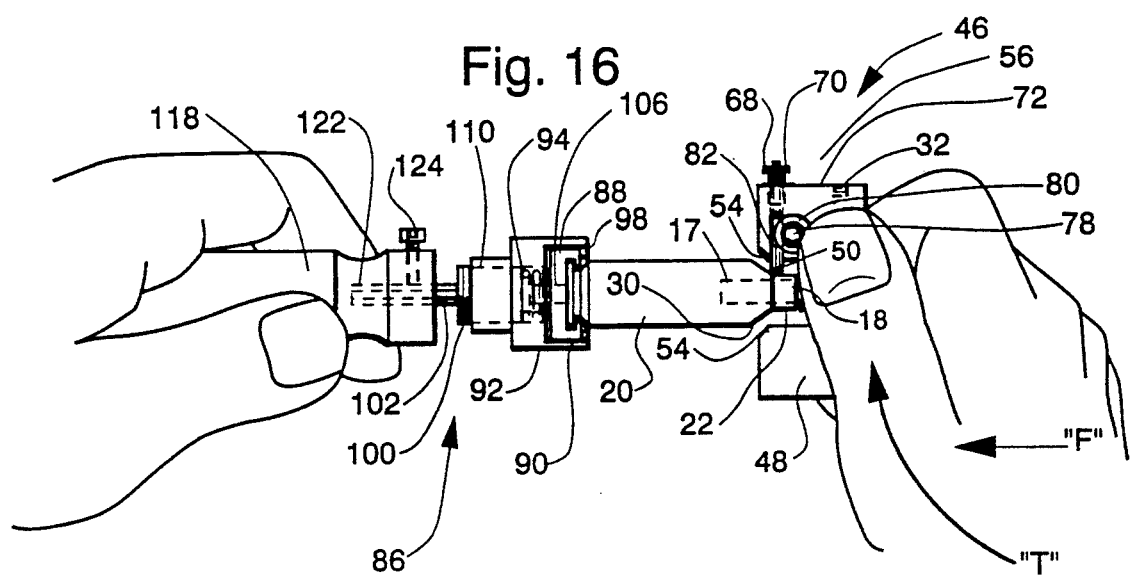

MICRO-ADJUSTABLE CASE NECK TURNING TOOL

BACKGROUND OF THE INVENTION

The present invention relates to a processing tool for employment by precision firearm marksmen in preparing cartridges having high inherent accuracy characteristics, and is comprised of a micro-adjustable case neck turning tool which enables one to consistently achieve a measured close tolerance undersize trimming and trueing of a case neck outer diameter for minimal possibility of there being a mis-aligned angle of incidence in a loaded cartridge bullet-to-bore relationship upon cartridge ignition and discharge delivery of a bullet from the case mouth into the firearm barrel.

Part of the ballistic mechanics of safe discharge of a bullet from a cartridge case neck into the barrel bore upon cartridge ignition and firing is that there be a case neck expansion clearance space between the loaded cartridge case neck outer diameter and the firearm chamber neck recess inner diameter to allow for equalization of ignition pressures, and the recommended safe clearance standard in the foregoing respect is typically 0.009-inch, which is based on an overclearance allowance for accumulated chamber fouling from powder and metal residue build up over repeated cartridge discharges between bore and chamber cleaning. However, with a 0.009-inch clearance there is also a sufficient room to allow for an angular mis-alignment of a seated cartridge within the chamber so that upon cartridge ignition the bullet enters the barrel at a cant rather than being on axial alignment with the bore, which results in a significant inaccuracy consequence when one is involved in the art of precision shooting.

It is typical of precision shooters, as a procedural technique of the art, to clean their firearm bore and chamber much more frequently than is either the custom or habit of other types of shooters. Therefore, chamber to cartridge oversize allowance for purposes of accommodating fouling accumulation with respect to ballistic safety and cartridge ignition pressure build up is reduced, and closer cartridge neck-to-chamber tolerances may be safely accommodated, typically on the order of 0.0015 to 0.002-inch with resultant reduction of the likelihood of bullet cant and axial mis-alignment thereof with the barrel bore axis upon cartridge ignition.

In addition to applicant's tool, the case neck turning tool most widely available for trimming case necks to close tolerance undersize for precision shooting is known as the Marquart Precision Case Neck Turning Tool, manufactured by the Marquart Precision Company, Inc., of Prescott, Ariz., which is adequate and effective for case neck trimming but is limited to a conventional threaded screw trimming blade displacement adjustment means and thereby lacking the precise trimming blade displacement and set capability provided by the tool of instant invention.

The applicant herein by his invention provides a novel and utilitarian tool for accomplishing reliable and accurately changed micro-adjustably measured cartridge case neck trimming blade vertical displacements and sets of 0.0002-inch with interpolated increments of 0.0001-inch in the procedural carrying out of case neck turning.

SUMMARY OF THE INVENTION

It is the principal object of the present invention to provide a micro-adjustable case neck turning tool for achieving consistent close tolerance trimming and trueing of the outside diameter of a cartridge case neck to thereby uniformily undersize the same for close tolerance receiving and positioning thereof upon cartridge lock-up within a firearm chamber.

It is another object of the present invention to provide a micro-adjustable case neck turning tool which incorporates a compound thread adjustment and rotational displacement measurement means whereby the case neck trimming blade may be repeatedly and reliably adjusted and set in vertically measured increments of 0.0002-inch and interpolated increments of 0.0001-inch.

It is also an object of the present invention to provide a micro-adjustable case neck turning tool having a trimming blade configured with a negative rake cutting edge to thereby enhance performance in both the operational smoothness and finish of soft metal trimming.

A further object of the present invention is to provide a micro-adjustable case neck turning tool wherein the trimming blade thereof is further provided with an angled inside shoulder cut closely conforming to the shoulder angle at the case neck base and thereby enable blending of the neck turning cut with the shoulder angle on the case.

It is yet another object of the present invention to provide a micro-adjustable case neck turning tool whereby cartridge case necks conformed to close tolerance uniform outside diameter chamber undersizing therewith increases the inherent cartridge factor accuracy by reducing substantially the potential for a mis-aligned angle of incidence in discharge delivery of a bullet from the case mouth into the firearm barrel.

It is also an object of the present invention to provide a micro-adjustable case neck turning tool the use of which prolongs case neck life in terms of reloading cycles due to the reduced trimming removal of case neck metal and working of the case neck on expansion within the firearm chamber upon cartridge detonation and resizing upon preparation for reloading.

Another object of the present invention is to provide a micro-adjustable case neck turning tool having a case-holding chuck adapted for rotational use with either a manually or mechanically operated hand-held support.

The foregoing, and other objects hereof, will be readily evident upon a study of the following specification and accompanying drawings comprising a part thereof.

BRIEF DESCRIPTION OF THE DRAWINGS

FIG. 10 is a broken away fragmentary sectional view of the assembled trimming blade and compound thread adjustment component illustrating the mechanics of accomplishing vernier displacement adjustment of the trimming blade.

FIG. 11 is a top plan view of the case holding chuck.

FIG. 12 is a vertical section of the case holding chuck as seen along the line 12—12 of FIG. 11.

FIG. 13 is a top plan view of the case holding chuck illustrating use of an Allen wrench as a tightening lever to secure a more compressive retention of a cartridge case within the holding chuck.

FIG. 14 illustrates installation of the case holding chuck within a manually hand-held support.

FIG. 15 illustrates installation of the case holding chuck within a mechanical hand-held support.

FIG. 16 illustrates the preferred manner of manually employing the micro-adjustable case neck turning tool.

DETAILED DESCRIPTION OF THE INVENTION

Figure 1:
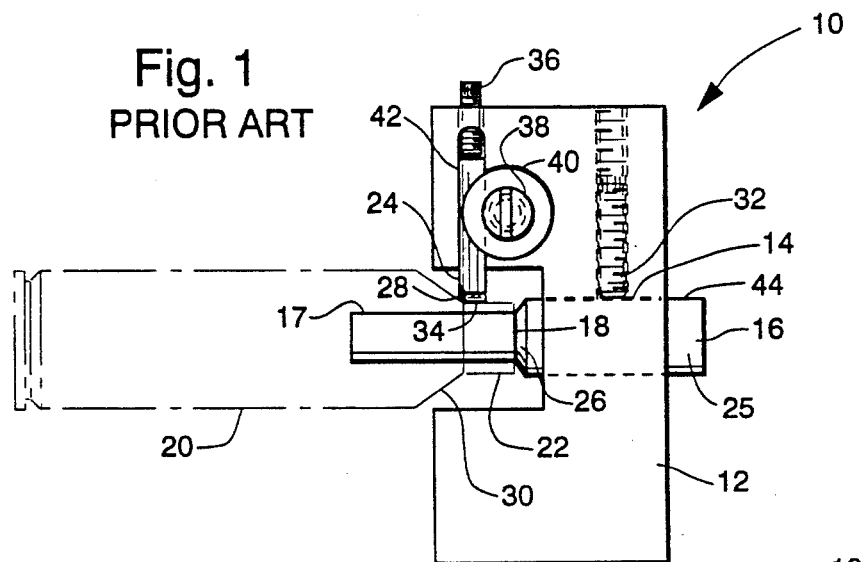
FIG. 1 is a simplified side elevation view of an exemplary prior art case neck turning tool.
Figure 2:
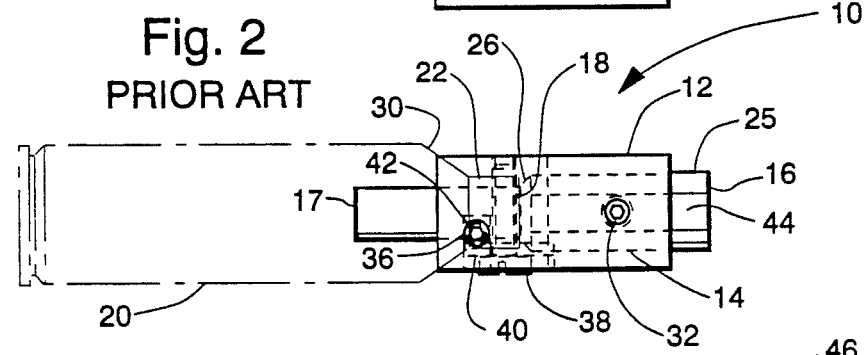
FIG. 2 is a top plan view of the exemplary prior art case neck turning tool as shown in FIG. 1.

Referring to FIGS. 1 and 2, wherein is respectively shown a simplified side elevation and corresponding top plan view of an exemplary prior art case neck turning tool 10, being comprised of a tool body 12 which is adapted to supportably receive adjustably through a spindle opening 14 therein a case mounting spindle 16 for in turn supportably receiving rotationally upon the case neck insertion extension 17 thereof a typical cartridge case 20 through the case neck opening 18 thereof, whereby turning of the case neck 22 may be accomplished by means of the trimming blade 24 upon rotation of the tool 10 or alternately the case 20. It will be noted that the case mounting spindle 16 is adjustable laterally by closely supported slidable displacement of the case spindle barrel 25 within the spindle opening 14 whereby insertable lateral advancement of the case neck opening 18 upon the case neck insertion extension 17 during neck turning operations is stopped by contact with the spindle shoulder 26 at a point where the trimming blade angled inside shoulder 28 will be positioned at the end of neck turning to thereby smoothly conform the finish of a neck trimming cut to the case neck shoulder angle 30 as shown in FIG. 1. Once laterally adjusted to accomplish the foregoing, the case mounting spindle is then lockably fixed by means of compressive engagement of the spindle set screw 32 with the spindle barrel 25, and then the lateral insertion and retraction aspects of the case neck 22 to tool 10 make-ready for accomplishing case neck turning of a particular batch of similar sized cartridge cases 20 is set.

Secondly, the amount of case neck metal to be removed in trimming to achieve undersize trueing during case neck turning operations is set by vertical adjustment of the trimming blade 24 to bring the cutting edge 34 thereof into proper depth of cut coincidence with the case neck 22. In use of the prior art tool 10 this adjustment is accomplished through trial-and-error displacement movement of the trimming blade 24 by means of the trimming blade adjustment screw 36, and then fixing the trimming blade displaced depth of cut extension or retraction position by means of the trimming blade set screw 38 and blade shank compression washer 40 engagement with the blade shank 42.

The top plan view of the exemplary case neck turning tool 10 as illustrated in FIG. 2 better shows that the case spindle barrel 25 is secured in adjusted positioning by means of compressive engagement by the spindle set screw 32 upon a case spindle barrel flat 44.

Figure 3:
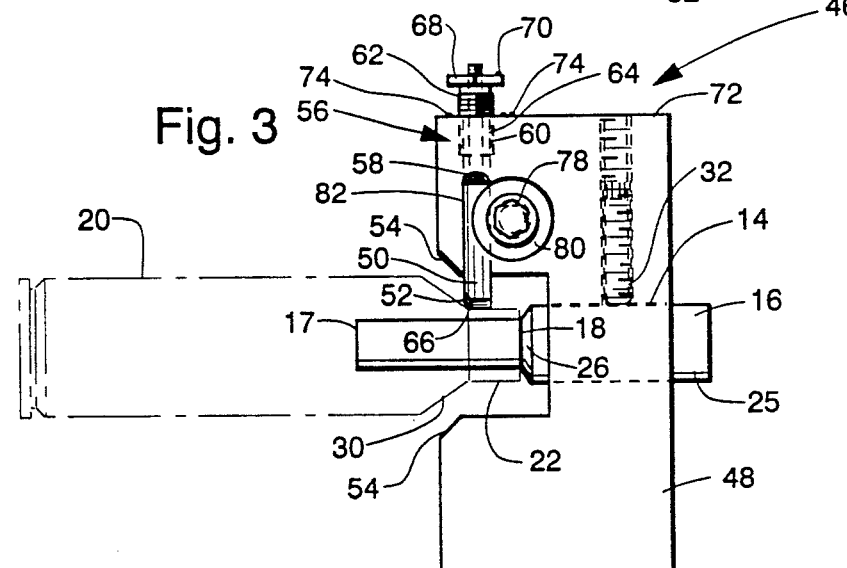
FIG. 3 is a simplified side elevation view of the micro-adjustable case neck turning tool of instant invention.
Figure 4:
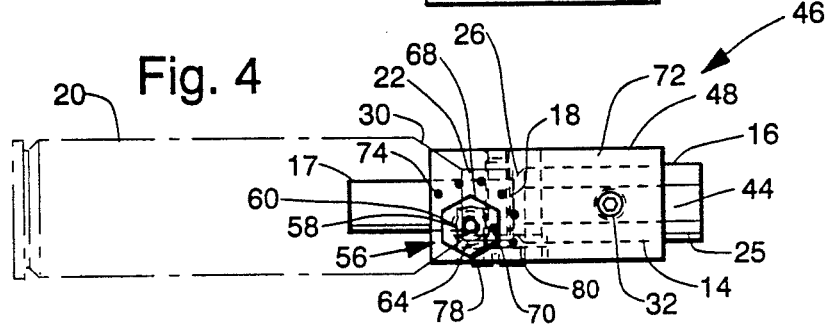
FIG. 4 is a top plan view of the micro-adjustable case neck turning tool as shown in FIG. 3.

Considering now FIGS. 3 and 4, which respectively show a simplified side elevation and corresponding top plan view of the micro-adjustable case neck turning tool 46 of instant invention, being provided with a generally E-shaped tool body 48 which is likewise adapted to supportably receive adjustably through a spindle opening 14 therein a case mounting spindle 16 for supportably receiving rotationally upon the case neck insertion extension 17 a typical cartridge case 20 through the case neck opening 18 thereof, whereby turning of the case neck 22 in this instance is accomplished by means of a micro-adjustable negatively raked blade 50 upon rotation of the tool 46 or alternately the case 20, wherein the specific advantages and features of employing a negatively raked blade 50 in accomplishing soft metal turning such as with brass, being the predominate material from which cartridge cases are formed, will be explained upon detailed consideration of FIGS. 7 through 10 hereinafter.

It will again be noted that the case mounting spindle 16 is adjustable laterally within the mouth of the generally E-shaped tool body 48 by closely supported slidable displacement of the case spindle barrel 25 within the spindle opening 14 therefor, whereby insertable lateral advancement of the case neck opening 18 upon the case neck insertion extension 17 during neck turning operations is stopped by contact with the spindle shoulder 26 at a point where the negatively raked blade angled inside shoulder 52 will be properly positioned at the end of neck turning to thereby smoothly conform the finish of the neck trimming cut to the case neck shoulder angle 30 as shown in FIG. 3. It will also be noted that the opening to the mouth of the generally E-shaped tool body 48 is provided with complementary cooperatively angled chamfers 54 which better adapt the mouth of the generally E-shaped tool body 48 to receive cartridge cases 20 of larger diameter with correspondingly larger angled case neck shoulders 30, as well as receiving typical diameter cartridge cases 20 but of longer case necks 22 which would consequently require deeper placement upon the case neck insertion extension 17 within the mouth of the generally E-shaped tool body 48 in order to fully complete case neck turning to the base of the case neck shoulder 30.

Once the foregoing case insertion lateral adjustment of the case mounting spindle 16 has been achieved, the case mounting spindle 16 is then lockably fixed by means of compressive engagement of the spindle screw 32 upon the barrel flat 44 of the spindle barrel 25, and the lateral insertion and retraction aspects of the case neck 22 to tool 46 make-ready for accomplishing case neck turning of a particular batch of similar sized cartridge cases 20 is set.

Next, the amount of case neck metal to be removed in trimming to achieve undersize trueing during case neck turning of a particular batch of similar sized cartridge cases 20 is accomplished by use of the vertically moveable micro-adjustable compound thread displacement assembly 56, the working details of which will be described in detail on subsequent consideration of FIG. 10. At this point, however, suffice it to say that said assembly 56 is comprised of and cooperatively operable by means of a blade body threaded shaft 58 vertically moveable within the complementary internal threaded bore 60 of the externally threaded micro-adjustment barrel 62, in turn vertically moveable and operable within a complementary tool body threaded opening 64 all in effecting a plus or minus 0.0002-inch up or down measured, and 0.0001-inch interpolated vertical displacement of the negatively raked blade cutting edge 66 with respect to the case neck 22 when supportably installed upon the case neck insertion extension 17 as shown in FIGS. 3 and 4.

As will be noted in both FIGS. 3 and 4, the rotation nut head 68 mounted to the upper end of the micro-adjustment barrel 62 is provided with a rotational displacement index reference 70, and at regularly spaced angular displacements placed arcuately around the rotation nut head 68 within the upper surface of the top E-leg 72 of the generally E-shaped tool body 48 are a corresponding plurality of rotational displacement index marks 74. Again, as will be hereinafter more fully explained, it is the rotational displacement movement of the rotation nut head 68 as comparatively measured by the arcuate displacement of the index reference 70 thereon with respect to the beginning and ending positioned rotational displacement index marks 74, clockwise or counterclockwise, which provides the positive up or down accurately measured 0.0002-inch vertical displacement movement, and between mark positioning interpolated 0.0001-inch displacements of the negatively raked blade cutting edge 66 with respect to the case neck 22, and the amount of metal to be trimmed therefrom in accomplishing the close tolerance chamber trimming fit thereof.

Once the appropriate cutting edge 66 adjustment has been achieved, then the blade 50 is securely set in a locked run position by means of tightening the blade adjustment lock screw 78 which thereby causes the blade set lock washer 80 to compressively engage the blade 50 and frictionally retain the vertical displacement set thereof within the top E-leg blade channel 82.

The micro-adjustable case neck turning tool 46 as shown and illustrated in FIGS. 3 and 4, and certain subsequent Figures hereinafter, may be cast or machine and fabricated from various metals and alloys thereof, or plastics, or combinations of metals and metal alloys and plastics by methods and techniques commonly employed in such operations.

Figure 8:
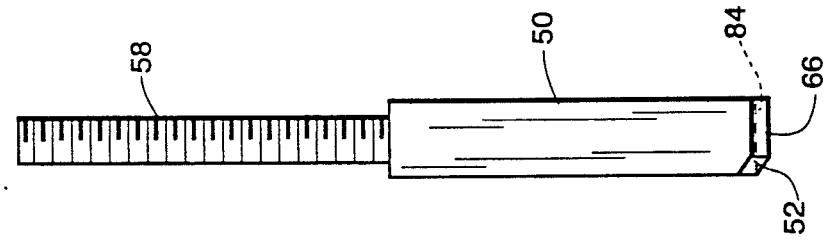
FIG. 8 is a side elevation view of the micro-adjustable case neck turning tool trimming blade as shown in FIG. 7.
Figure 7:
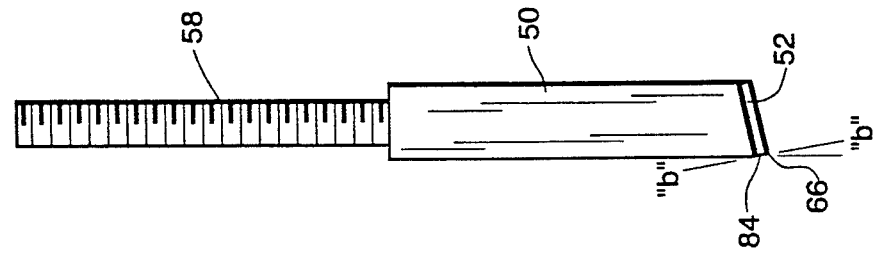
FIG. 7 is an enlarged front elevation view of the micro-adjustable case neck turning tool trimming blade.
Figure 5:
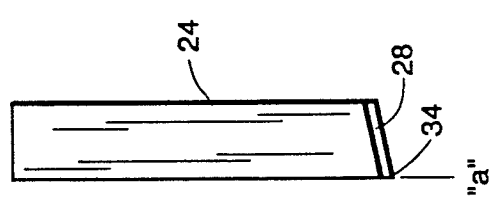
FIG. 5 is an enlarged front elevation view of an exemplary prior art case neck turning tool trimming blade.
Figure 6:
FIG. 6 is a side elevation view of the exemplary prior art case neck turning tool trimming blade as shown in FIG. 5.

Referring now to FIGS. 5 and 6 which are respectively enlarged front and side elevation views of the typical prior art trimming blade 24, wherein it will be noted, as particularly shown in FIG. 5, the cutting edge 34 thereof is on a parallel same plane extension of the leading face of the blade body, being indicated by the prior art blade cutting edge angle extension line "a". Thus, the prior art trimming blade 24 cutting edge 34 operates perpendicular to the case neck 22 during trimming, and when one is turning a soft metal such as brass a perpendicular turning cut tends to push as well as cut the metal, thereby reducing both the smoothness of cut as well as operation. Applicant's negatively raked blade 50, however, as shown respectively in enlarged front and side elevation views in FIGS. 7 and 8, has a so called negative rake 84 inward from the leading face of the blade body 50, being indicated by the blade cutting edge angle extension line "b". It is an experiential fact that when one turns soft metal such as brass, for trimming in the manner herein described, a blade having a negative rake 84 such as indicated by the blade cutting edge angle extension line "b", cuts and does not simultaneously distort the cutting surface by pushing the metal at the cutting contact interface thereby providing a smoother cut and greater ease of operation, and it is for these reasons that Applicant herein employs a negative rake 84 as best illustrated in FIGS. 7 and 8 to provide a negatively raked blade cutting edge 66 on his micro-adjustable blade 50.

Figure 9:
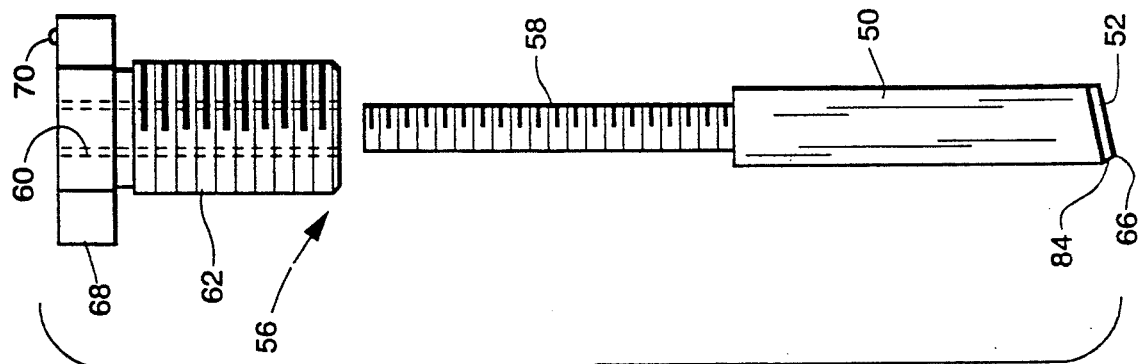
FIG. 9 is an exploded front elevation view of the micro-adjustable case neck turning tool trimming blade and the compound thread adjustment component whereby vernier displacement adjustment of the trimming blade is accomplished.

Considering now the exploded front elevation view of FIG. 9, therein showing major component elements of the vertically moveable micro-adjustable compound thread displacement assembly 56, the operational explanation of which in consistently achieving close tolerance incremental vertical adjustment of blade 50 displacement adjustments will be considered on explanation of FIG. 10.

As shown in FIG. 9, the assembly 56 consists of two sets of cooperatively operational threaded systems of differing thread pitches, the first such threaded system being that of the blade body threaded shaft 58 and complementary internal threaded bore 60 which is of a first threaded pitch and different from that of the second threaded system, being that of the externally threaded micro-adjustment barrel 62 with the complementary tool body threaded opening 64, the latter of which is not shown in FIG. 9 but as seen in FIG. 10, and is of a second treaded pitch. Thus, when the two threaded systems are assembled and the blade shaft 50 is maintained in a non-rotational position, and the rotation nut head 68 is arcuately displaced the two inter-operational cooperative threaded systems mechanically function in motion translation as a compound inclined plane incremental vernier vertical displacement unit and thereby provide the vertically moveable micro-adjustable compound thread displacement assembly 56 by which said blade 50 is measureably moved up or down in 0.0002-inch increments, and 0.0001-inch interpolated increments.

Refering now to FIG. 10 to explain an exemplary 0.0002-inch measured vertical adjustment of the negatively raked blade cutting edge 66 by means of employing the vertically moveable micro-adjustable compound thread displacement assembly 56, wherein for purposes of exemplary explanation the first threaded system thereof is comprised of the blade body threaded shaft 58 and complementary internal threaded bore 60 and has a pitch of 44-threads per inch, and the second threaded system thereof which is comprised of the externally threaded micro-adjustment barrel 62 with the complementary tool body threaded opening 64 and has a pitch of 40-threads per inch, these being the preferred first to second threaded system thread pitch ratios, but are not to be considered per se either limiting or restrictive. With the foregoing first and second system thread pitch ratios, however, and the blade shaft 50 being held from rotational movement by means of the top E-leg blade channel 82, we will consider for example the vertical displacement effect imparted to the negatively raked blade cutting edge 66 upon one complete 360-degree downward (clockwise) rotation of the rotation nut head 68 which is fixedly assembled to the externally threaded micro-adjustment barrel 62 and as measured by the rotational displacement index reference 70 thereon with respect to the rotational displacement index marks 74 placed at 30-degree angular displacements radially about the externally threaded micro adjustment barrel 62 upon the upper surface of the top E-leg 72 as shown, but better illustrated in FIG. 4. Thus, one complete 360-degree downward measured revolution of the externally threaded micro adjustment barrel 62 as above described will accomplish a downward vertical displacement of one thread width thereof, and at a pitch of 40-threads per inch is equivalent to 0.025-inch, which is represented by the dimension shown as "d sub 1" in FIG. 10. Since the blade body 50 is slidably captured within the top E-leg blade channel 82, which prevents rotation thereof upon rotary movement of the externally threaded micro adjustment barrel 62, the blade body threaded shaft 58 is also prevented from rotation relative to rotary displacement of the adjustment barrel 62, and is thus caused to vertically upward displace within the complementary internal threaded bore 60 by one thread width, and at a pitch of 44-threads per inch is equivalent to 0.0227-inch, which is represented by the dimension shown as "d sub 2" in FIG. 10. Therefore, the net downward displacement of the negatively raked blade cutting edge 66 is equal to "d sub 1" minus "d sub 2", being 0.0250-inch minus 0.0227-inch which equals 0.0023-inch per one complete 360-degree revolution of the externally threaded micro adjustment barrel 62, which differential of downward displacement of the blade cutting edge 66 is represented by "D" in FIG. 10.

Consequently, when one rotates the rotation nut head 68 a measured angular displacement of 30-degrees, as comparatively accomplished by means of the rotational displacement index reference 70 with respect to the rotational displacement index marks 74 as previously described, which is a net differential vertical displacement distance of the blade cutting edge 66 by an amount of 0.0023-inch divided by 360/30, which equals 0.00019 inch rounded-off to 0.0002-inch. And, when one rotationally displaces the index reference 70 to a measured position half-way between the rotational displacement index marks 74 there is an interpolated resultant net differential vertical displacement distance of the blade cutting edge 66 by half of that for a 30-degree angular displacement, or 0.0001-inch. Thus explains operation of the vertically moveable micro-adjustable compound thread displacement assembly 56 in accomplishing measured adjustment set of the negatively raked blade cutting edge 66 in vertical displacement increments of 0.0002-inch, and interpolated increments of 0.0001-inch.

Considering now the case holding chuck as illustrated in FIGS. 11 through 13, whereby a cartridge case 20 is securely held and retained in working position for case neck 22 turning and trueing operations during use of the micro-adjustable case neck turning tool 46.

Basically the case holding chuck 86 is a compression holding device for secure positioning and retention of a cartridge case 20, with the operational features of being mechanically simple and relatively easy to operate, while incorporating the use of a standard shell holder 88 for holding the particular size of case 20 being worked. The proper sized shell holder 88 is first slidably installed within the shell holder slot 90 of the chuck housing 92 and frictionally retained therein by means of a compression spring 94 that is captured within the chuck housing spring well 96 and compressively bears against the bottom of the shell holder 88 so it is thereby engaged and frictionally retained compressively against the chuck housing shell holder retaining lip 98. Once the shell holder 88 is thus installed therein, it will be noted that the chuck housing threadably receives within the lower end thereof a threaded chuck shaft collar 100 within which is axially mounted and retained a downwardly projecting chuck housing spindle 102 and upwardly supported therefrom within the chuck housing spring well 96 a spring centering collar 104 from which in turn is supported an upwardly projecting case head compression shaft 106 which projects through the central shell holder opening 108 when the threaded chuck shaft collar 100 is screwed upward within the chuck housing threaded opening 110 therefor. The case head compression shaft 106 serves both to aid in retaining the shell holder 88 in an installed working position when projectedly inserted within the central opening 108 thereof, as well as providing the primary function of frictionally retaining the cartridge case 20 therein by being threadably forced into compressive engagement against the cartridge case head 112 and thereby lockably engaging compressively the entire case supporting and securing system of the case holding chuck 86 as previously described. As an added feature, for being able to gain greater leverage when manually screwing the threaded chuck shaft collar 100 upwardly to bring the case head compression shaft 106 into tight locked contact with the cartridge case head 112, the chuck housing 92 is provided with a lateral lever arm receiving opening 114 through which a lever member 116, such as an Allen wrench for example as would otherwise be employed to tighten the spindle set screw 32, may be inserted as shown in FIG. 13 to thereby provide an enhanced mechanical advantage lever arm means during the rotary tightening operation in the direction of the arrow as also shown in FIG. 13.

In order to properly and effectively employ the case holding chuck 86 in combination with the micro-adjustable case neck turning tool 46 for holding a case 20 to be worked, it may be installed in a chuck handle 118 as shown in FIG. 14, or alternately in a slow speed portable rotary power tool chuck 120 as shown in FIG. 15. When the chuck handle 118 is employed, which requires manually stabilized operation thereof in combination with the micro-adjustable case neck turning tool 46, the chuck housing spindle 102 is simply insertably installed within a central handle opening 122 adapted to slidably receive the same and is then retainably secured therein by means of a compression set screw 124 as shown in FIG. 14, thus supportably mounting the case holding chuck 86 within the chuck handle 118 for operational use as illustrated in FIG. 16. In the alternate use situation, when one is employing a slow speed rotary power tool, the case holding chuck 86 case housing spindle 102 is simply secured within the rotary power tool chuck 120, in the manner well known as shown in FIG. 15, and then the drive of the power tool is employed to impart rotary motion to the case 20 for turning and trueing of the neck 22 thereof by means of the micro-adjustable case neck turning tool 46.

The view shown in FIG. 16 illustrates the preferred manner of manually employing the micro-adjustable case neck turning tool 46 to trim and true the neck 22 of a case 20 which is supportably held and retained within the case holding chuck 86 when mounted in the chuck handle 118, in which application the case 20 is preferably held in a stationary position and the case neck turning tool 46 is rotated in that direction indicated by the arrow "T" while simultaneously and progressively manually moving the tool 46 forward in the direction indicated by the arrow "F" in order to thereby systematically accomplish trimming and trueing of the neck 22. When using a portable rotary power tool for mounting and driving the case holding chuck 86 as shown in FIG. 15, then the preferred operational use method in order to effect case neck trimming and trueing is to hold the turning tool 46 stationary while the mounted case 20 is manually moved forward during rotational driving by the power tool.

Although the micro-adjustable case neck turning tool invention hereof, the structural characteristics and methods of employment thereof, respectively have been shown and described in what is conceived to be the most practical and preferred embodiment, it is recognized that departures may be made respectively therefrom within the scope of the invention, which is not to be limited per se to those specific details as disclosed herein but is to be accorded the full scope of the claims so as to embrace any and all equivalent such devices, apparatus, and methods.

I claim:

1. A micro-adjustable case neck turning tool wherein said tool has a tool body having a generally E-shaped configuration and mounted therein a slidably adjustable case mounting spindle adapted to insertably receive and support a cartridge case through the case neck opening thereof and position the same perpendicularly to a vertically adjustable case neck trimming blade adapted for trimming and trueing the outside diameter of a cartridge case neck wherein the improvement comprises a trimming blade adjustment means embodying two cooperatively operational threaded systems of differing threaded pitches to effect measured micrometer adjustment of a cutting edge of said trimming blade with respect to said case neck wherein a first of said two cooperatively operational threaded systems is comprised of a blade body threaded shaft and a complementary internal threaded bore axially aligned within an externally threaded micro-adjustment barrel and a second of said two cooperatively operational threaded systems is comprised of said externally threaded micro-adjustment barrel and a complementary tool body threaded opening therefor whereby said cutting edge of said trimming blade with respect to said case neck is slidably adjustable vertically within a conformingly shaped top E-leg blade channel of said tool body and is prevented from rotational movement thereby.

2. A micro-adjustable case neck turning tool according to claim 1 wherein said slidably adjustable case mounting spindle is adjustably set in extension for case neck trimming and trueing operations by means of a spindle set screw.

3. A micro-adjustable case neck turning tool according to claim 2 wherein said slidably adjustable case mounting spindle is provided with a case neck insertion extension having an outside diameter closely complementary to but slightly less than that of the inside diameter of said case neck for insertably received support thereby.

4. A micro-adjustable case neck turning tool according to claim 3 wherein said slidably adjustable case mounting spindle is provided with a spindle shoulder intermediate a spindle barrel body section and the case neck insertion extension thereof, which shoulder functions as a stop limit for case neck insertion upon said insertion extension.

5. A micro-adjustable case neck turning tool according to claim 1 wherein said case neck trimming blade is provided with an angled shoulder adapted to conform the end of a case neck trimming and trueing cut to the shoulder angle of the case being worked.

6. A micro-adjustable case neck turning tool according to claim 5 wherein said case neck trimming blade is further provided with a negative rake along the case neck cutting edge thereof.

7. A micro-adjustable case neck turning tool according to claim 1 wherein the thread pitch of said first of said two cooperatively operational threaded systems is 40-threads per inch.

8. A micro-adjustable case neck turning tool according to claim 1 wherein the thread pitch of said second of said two cooperatively operational threaded systems is 44-threads per inch.

9. A micro-adjustable case neck turning tool according to claim 1 wherein the compound thread system thereof is rotationally adjustable in upward or downward measured vertical displacement by means of a rotation nut head fixably assembled to the upper terminal end of said externally threaded micro-adjustment barrel above the upper surface of said top E-leg of said tool body.

10. A micro-adjustable case neck turning tool according to claim 9 wherein said rotation nut head is provided with a rotational displacement index reference mark.

11. A micro-adjustable case neck turning tool according to claim 10 wherein said upper surface of said top E-leg of said tool body is provided with a plurality of equal radially spaced rotational displacement index marks about the outer periphery of the rotation nut head.

12. A micro-adjustable case neck turning tool according to claim 11 wherein said equal radially spaced distance between said plurality of said rotational displacement index marks is 30-degrees.

13. A micro-adjustable case neck turning tool according to claim 12 wherein a measured radial displacement of the displacement index reference mark on said rotation nut head of 30-degrees with respect to said plurality of rotational displacement index marks vertically displaces the case neck cutting edge of said case neck trimming blade by an approximate measured amount of 0.0002-inch.

14. A micro-adjustable case neck turning tool according to claim 13 wherein an estimated radial displacement of the displacement index reference mark on said rotation nut head of 15-degrees with respect to said plurality of rotational displacement index marks vertically displaces the case neck cutting edge of said case neck trimming blade by an interpolated amount of 0.0001-inch.

15. A micro-adjustable case neck turning tool wherein said tool has a tool body having a generally E-shaped configuration and mounted therein a slidably adjustable case mounting spindle adapted to insertably receive and support a cartridge case through the case neck opening thereof and position the same perpendicularly to a vertically adjustable case neck trimming blade adapted for trimming and trueing the outside diameter of a cartridge case neck wherein the improvement comprises a trimming blade adjustment means embodying two cooperatively operational threaded systems of differing threaded pitches to effect measured micrometer adjustment of a cutting edge of said trimming blade with respect to said case neck wherein a first of said two cooperatively operational threaded systems is comprised of a blade body threaded shaft and a complementary internal threaded bore axially aligned within an externally threaded micro-adjustment barrel and a second of said two cooperatively operational threaded systems is comprised of said externally threaded micro-adjustment barrel and a complementary tool body threaded opening therefor whereby said cutting edge of said trimming blade with respect to said case neck is slidably adjustable vertically within a conformingly shaped top E-leg blade channel of said tool body and is prevented from rotational movement thereby, and a case holding chuck means incorporating a compression spring biased shell holder and adapted to supportably retain said cartridge case during case neck trimming and trueing operations by said tool.

16. A micro-adjustable case neck turning tool according to claim 15 wherein said slidably adjustable case mounting spindle is adjustably set in extension for case neck trimming and trueing operations by means of a spindle set screw.

17. A micro-adjustable case neck turning tool according to claim 16 wherein said slidably adjustable case mounting spindle is provided with a case neck insertion extension having an outside diameter closely complementary to but slightly less than that of the inside diameter of said case neck for insertably received support thereby.

18. A micro-adjustable case neck turning tool according to claim 17 wherein said slidably adjustable case mounting spindle is provided with a spindle shoulder intermediate a spindle barrel body section and the case neck insertion extension thereof, which shoulder functions as a stop limit for case neck insertion upon said insertion extension.

19. A micro-adjustable case neck turning tool according to claim 15 wherein said case neck trimming blade is provided with an angled shoulder adapted to conform the end of a case neck trimming and trueing cut to the shoulder angle of the case being worked.

20. A micro-adjustable case neck turning tool according to claim 19 wherein said case neck trimming blade is further provided with a negative rake along the case neck cutting edge thereof.

21. A micro-adjustable case neck turning tool according to claim 15 wherein the thread pitch of said first of said two cooperatively operational threaded systems is 40-threads per inch.

22. A micro-adjustable case neck turning tool according to claim 15 wherein the thread pitch of said second of said two cooperatively operational threaded systems is 44-threads per inch.

23. A micro-adjustable case neck turning tool according to claim 15 wherein the compound thread system thereof is rotationally adjustable in upward or downward measured vertical displacement by means of a rotation nut head fixably assembled to the upper terminal end of said externally threaded micro-adjustment barrel above the upper surface of said top E-leg of said tool body.

24. A micro-adjustable case neck turning tool according to claim 23 wherein said rotation nut head is provided with a rotational displacement index reference mark.

25. A micro-adjustable case neck turning tool according to claim 24 wherein said upper surface of said top E-leg of said tool body is provided with a plurality of equal radially spaced rotational displacement index marks about the outer periphery of the rotation nut head.

26. A micro-adjustable case neck turning tool according to claim 25 wherein said equal radially spaced distance between said plurality of said rotational displacement index marks is 30-degrees.

27. A micro-adjustable case neck turning tool according to claim 26 wherein a measured radial displacement of the displacement index reference mark on said rotation nut head of 30-degrees with respect to said plurality of rotational displacement index marks vertically displaces the case neck cutting edge of said case neck trimming blade by an approximate measured amount of 0.0002-inch.

28. A micro-adjustable case neck turning tool according to claim 27 wherein an estimated radial displacement of the displacement index reference mark on said rotation nut head of 15-degrees with respect to said plurality of rotational displacement index marks vertically displaces the case neck cutting edge of said case neck trimming blade by an interpolated amount of 0.0001-inch.

29. A micro-adjustable case neck turning tool according to claim 15 wherein said case holding chuck means is adapted to be insertably supported by a chuck handle for manual case neck trimming and trueing operations.

30. A micro-adjustable case neck turning tool according to claim 15 wherein said case holding chuck means is adapted to be insertably supported by a slow speed portable rotary power tool chuck for motor driven case neck trimming and trueing operations.

* * * * *